_(12)_ United States Patent
De Haan et al.

(10) Patent No.: US 8,829,398 B2
(45) Date of Patent: Sep. 9, 2014

(54) HEATING PROCESS OF A BOILER OF A COFFEE MAKER

(75) Inventors: Thijs De Haan, Drachten (NL); Haayo Nicolai, Hoogeveen (NL); David Johannus Theodorus Huntink, Hoogeveen (NL); Jean Bart Bleeker, Hoogeveen (NL)

(73) Assignee: Koninklijke Philips N.V., Eindhoven (NL)

( * ) Notice: Subject to any disclaimer, the term of this patent is extended or adjusted under 35 U.S.C. 154(b) by 1132 days.

(21) Appl. No.: 11/630,300

(22) PCT Filed: Jun. 17, 2005

(86) PCT No.: PCT/IB2005/052001
§ 371 (c)(1),
(2), (4) Date: Dec. 19, 2006

(87) PCT Pub. No.: WO2006/000969
PCT Pub. Date: Jan. 5, 2006

(65) Prior Publication Data
US 2007/0205188 A1   Sep. 6, 2007

(30) Foreign Application Priority Data

Jun. 23, 2004   (EP) .................................... 04102909

(51) Int. Cl.
*H05B 1/02*   (2006.01)
*A47J 31/54*  (2006.01)

(52) U.S. Cl.
CPC ..................................... *A47J 31/545* (2013.01)
USPC ................................ 219/494; 99/279; 99/280

(58) Field of Classification Search
USPC ............. 219/494; 99/279, 280, 281, 282, 283
See application file for complete search history.

(56) References Cited

U.S. PATENT DOCUMENTS

| 5,285,717 A | * | 2/1994 | Knepler ........................... 99/282 |
| 5,307,733 A |   | 5/1994 | Enomoto |
| 5,375,508 A | * | 12/1994 | Knepler et al. .................. 99/280 |
| 5,539,856 A | * | 7/1996 | Andrew et al. ................ 392/467 |
| 5,865,097 A | * | 2/1999 | Smit ............................ 99/323.3 |
| 5,901,636 A | * | 5/1999 | Witziers et al. .................. 99/283 |

FOREIGN PATENT DOCUMENTS

EP   1076212 A2   2/2001

\* cited by examiner

*Primary Examiner* — John Wasaff

(57) ABSTRACT

In a coffee maker (1) having a boiler (6) and heating means (62) for heating a content of the boiler (6), safety measures are taken to prevent breakdown of the coffee maker (1) in the case in which the heating means (62) are activated while the boiler (6) is empty. The coffee maker (1) comprises a controller (10) having a memory (15) in which a flag indicating a filled state of the boiler (6) can be raised, which controller (10) is programmed to activate the heating means (62) to supply reduced heating power if the memory (15) does not contain the flag. A situation in which the boiler (6) gets overheated, even if the heating means (62) are shut off after having been operated, is prevented thereby.

10 Claims, 3 Drawing Sheets

HEATING PROCESS OF A BOILER OF A COFFEE MAKER

The present invention relates to a method of controlling heating means for heating a content of a boiler of a device such as a coffee maker.

A coffee maker having a boiler and heating means for heating a content of the boiler is well known. One known type of such a coffee maker comprises a brew chamber in which the coffee is made from ground coffee beans and hot water. When a user desires to obtain a cup of coffee, he places a coffee pad comprising an envelope filled with a quantity of ground coffee beans in the brew chamber. During operation of the coffee maker, a quantity of water is forced to flow through the coffee pad. In the process, the envelope acts as a coffee filter. The interaction between the pressurized water and the coffee pad inside the brew chamber thus provides the desired cup of coffee.

In the coffee maker, the boiler serves for heating the water to a predetermined temperature. The heating power needed for heating the water is supplied by the heating means. The coffee maker comprises a pump for pressurizing the water. The pump, the boiler, and the brew chamber are interconnected by tubes for water transport.

If the boiler is already filled with water at the start of a procedure of making coffee, it is sufficient to activate the pump only once during the procedure. As this is preferred to activating the pump more than once during the procedure, the coffee maker is arranged such that at the end of a coffee-making procedure the boiler gets filled with a quantity of water which may be used a next time the coffee maker is applied. More in particular, when the coffee maker is used, the boiler is operated first to heat the water that is contained by it. As soon as the water has reached the predetermined temperature, the pump may be activated to press the hot water through the coffee pad in the brew chamber and to supply a new quantity of water to the boiler at the same time. In fact, during operation of the pump, the quantity of hot water that is discharged from the brew chamber is replaced by this new quantity of water.

The procedure as described in the preceding paragraph can be executed without any problems when the coffee maker has already been used before. However, this procedure is not applicable to the situation in which the coffee maker is used for the very first time. In that situation, the boiler needs to be filled before the coffee-making procedure is initiated.

According to one known possibility, a process of filling the boiler for the very first time needs to be initiated by the user of the coffee maker. For this filling process, the user first has to take care that a sufficient quantity of water can be supplied to the boiler, and subsequently has to activate the pump to actually fill the boiler with water.

When the process of filling the boiler for the very first time needs to be initiated by the user, there is a risk that the user omits this process and activates the coffee maker to perform a coffee-making procedure right away. In that case, a hazardous situation arises in which an empty boiler is heated by the heating means. This may cause a breakdown of the coffee maker.

Naturally, measures have been developed for preventing breakdown of the coffee maker as a result of a heating process of an empty boiler. A known solution involves the use of a fuse, the heating means being shut off by the fuse, which is activated as soon as the temperature of the boiler exceeds a predetermined maximum. However, this preventive measure has proven not to be sufficient under all circumstances, and breakdown of the device is still a reality. It is an object of the present invention to provide an additional preventive measure in order to ensure that the device will not break down as a result of the heating means supplying heating power to an empty boiler.

It is noted that in the case of the coffee maker it is not possible to apply a relatively simple solution in the form of a float or the like to determine a water level in the boiler, in view of the fact that a certain level of internal pressure needs to be maintained for a proper operation of the coffee maker.

The object of the present invention is achieved by a heating means for heating a content of a boiler of a device such as a coffee maker, wherein the device comprises indicator means capable of indicating a filled state of the boiler, the method comprising the following steps:

checking whether the indicator means indicate that the boiler is filled;

exclusively if it is found that the indicator means indicate that the boiler is filled, activating the heating means to perform a primary heating process by supplying heating power to the boiler in accordance with a primary predetermined power/time schedule; and exclusively if it is found that the indicator means do not indicate that the boiler is filled, activating the heating means to perform a secondary heating process by supplying heating power to the boiler in accordance with a secondary predetermined power/time schedule;

wherein a level of the heating power supplied to the boiler in accordance with the secondary predetermined power/time schedule is reduced in comparison with a level of the heating power supplied to the boiler in accordance with the primary predetermined power/time schedule, over at least a portion of the time covered by the secondary predetermined power/time schedule.

According to the present invention, the coffee maker comprises indicator means capable of indicating a filled state of the boiler, wherein a heating process starts with checking whether the indicator means indicate that the boiler is filled. If that appears to be the case, a primary heating process is initiated during which a primary power/time schedule is followed. In practice, the primary power/time schedule represents a normal heating process, which is carried out at a normal power level. According to the present invention, the primary power/time schedule is only followed when it is certain that the boiler is filled. If the indicator means do not indicate that the boiler is filled, there is a risk that the boiler is empty, and a secondary heating process is initiated in which a secondary power/time schedule is followed. According to an important aspect of the present invention, a level of the heating power in the secondary power/time schedule is reduced in comparison with a level of the heating power in the primary power/time schedule over at least a portion of the time covered by the secondary power/time schedule.

It is clear from the preceding paragraph that, in the case of the boiler being empty, it is ensured that the secondary heating process is carried out. In a practical way of carrying out the method according to the present invention, the temperature of the boiler is continuously monitored throughout the heating process, and the heating means are shut off as soon as a predetermined temperature has been reached. In order to prevent a situation in which damage occurs in the time directly after the heating means have been shut off, according to the present invention, the heating process is carried out at a power level that is reduced with respect to the normal power level over at least a period of time if an indication that the boiler is filled is absent. When the heating process is performed at a reduced power level, heating up of the boiler takes place at a slower rate, so that the chance that overheating occurs after the heating means have been shut off is practically zero.

In a preferred embodiment, the coffee maker comprises a microcontroller in which the primary predetermined power/time schedule, the secondary predetermined power/time schedule, and the associated conditions are laid down. The indicator means may comprise a memory of the microcontroller in which a flag representative of a state of the boiler, more in particular of a degree to which the boiler is filled, may be raised. According to one feasible possibility, such a flag is raised when the boiler is filled. In that case, the primary heating process is only started if this flag appears to be present, whereas the secondary heating process is started if this flag appears to be absent. According to another feasible possibility, a flag indicating that the power needs to be reduced during the heating process is used. In that case, the primary heating process is only started if this flag appears to be absent, whereas the secondary heating process is started if this flag appears to be present.

A reduction factor by which the power level associated with the secondary power/time schedule is reduced with respect to the power level associated with the primary power/time schedule may be substantially constant over time, so that the primary power/time schedule and the secondary power time schedule may have a comparable trend over time. For example, the power level associated with the secondary power/time schedule may be ⅔ of the power level associated with the primary power/time schedule.

It is also possible that the power fluctuates in the secondary power/time schedule but is substantially constant in the primary power/time schedule. In this way the power level associated with the secondary power/time schedule is reduced with respect to the power level associated with the primary power/time schedule. For example, in the primary power/time schedule the power is kept at a predetermined constant value over time, whereas in the secondary power/time schedule the power is alternately set for the predetermined constant value and for zero.

The present invention will now be explained in greater detail with reference to the figures, in which similar parts are indicated by the same reference signs, and in which.

Figure 1:
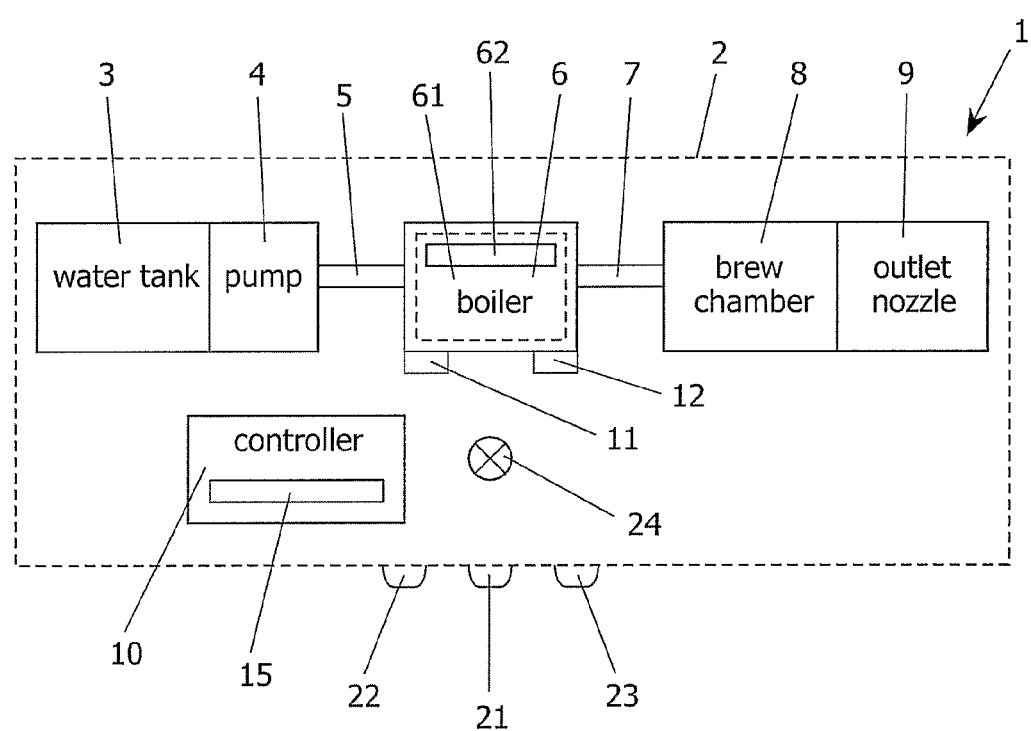
FIG. 1 is a block diagram showing various components of a coffee maker.

FIG. 1 diagrammatically shows various components of a coffee maker 1. This coffee maker 1 is to be regarded as an arbitrary example of a device having a boiler and heating means for heating a content of the boiler.

A first component of the coffee maker 1 shown is a housing 2 for accommodating most of the components of the coffee maker 1. At an outside of the housing 2, buttons 21, 22, 23 are arranged, which are to be pressed by a user of the coffee maker 1. One of the buttons 21, 22, 23 is referred to as main button 21, and needs to be pressed by the user if he wants to activate or turn off the coffee maker 1. Another one of the buttons 21, 22, 23 is denoted the single-cup button 22 and needs to be pressed at a certain stage in a coffee-making procedure if the user desires the coffee maker 1 to deliver a quantity of coffee for a single cup. Yet another one of the buttons 21, 22, 23 is denoted the two-cups button 23 and needs to be pressed at a certain stage in a coffee-making procedure if the user desires the coffee maker 1 to deliver a quantity of coffee for filling two cups. Besides the buttons 21, 22, 23, an indicator light 24 is arranged at the outside of the housing 2.

A second component of the coffee maker 1 shown here is a water tank 3 for containing water. This water tank 3 may be shaped in any suitable way. Preferably, the water tank 3 is detachably arranged, so that the user is capable of taking the water tank 3 to a tap or the like in order to fill the water tank 3 without having to move the entire coffee maker 1. The present invention, however, also applies to coffee makers which do not comprise a water tank, but which are connected to some kind of water supply system through a suitable closing device, such as a tap.

A third component of the coffee maker 1 shown is a pump 4 for forcing the water through the coffee maker 1, which pump 4 may be of any suitable type.

A fourth component of the coffee maker 1 shown is a boiler 6 for heating the water, which boiler 6 comprises a container 61 for containing water and a heating element 62 for heating the water to a predetermined temperature. In FIG. 1, the container 61 is diagrammatically depicted as a dashed rectangle, and the heating element 62 is depicted as a continuous rectangle.

The boiler 6 may be of any suitable type. The boiler 6 and the pump 4 are interconnected by means of a pump tube 5. When the pump 4 is operated, the water is forced to flow from the pump 4 to the boiler 6, through the pump tube 5.

A fifth component of the coffee maker 1 shown is a brew chamber 8. The brew chamber 8 and the boiler 6 are interconnected by means of a boiler tube 7. The brew chamber 8 is adapted to accommodate at least one coffee pad. During operation, the actual process of making coffee takes place inside the brew chamber 8, as in the brew chamber 8, the water is forced to flow through the coffee pad.

A sixth component of the coffee maker 1 shown is an outlet nozzle 9 which is directly connected to the brew chamber 8 and which serves to deliver freshly brewed coffee from the coffee maker 1.

A seventh component of the coffee maker 1 shown is a controller 10 which is arranged to receive signals relating to the states of various components of the coffee maker 1, for example the positions of the buttons 21, 22, 23, which is adapted to process these signals in accordance with a predetermined schedule, and which is adapted to control the operation of operable components, for example the indicator light 24 and the pump 4.

The controller 10 comprises a memory 15 in which flags may be raised and stored, which flags are representative of the state or states of one or more elements of the coffee maker 1. According to the present invention, it is at least possible to raise and store in the memory 15 a flag which is representative of a state of the boiler 6, more in particular of a degree to which the boiler 6 is filled. For example, the memory 15 may be a random-access memory (RAM). A characteristic of this type of memory is that it loses a raised flag as soon as the connection to the mains is interrupted.

An eighth component of the coffee maker 1 shown is a fuse 11 which is arranged to verify whether a temperature of the boiler 6 has exceeded a predetermined maximum temperature and to shut off the heating element 62 immediately as soon as this appears to be the case. For example, the fuse 11 is capable of interrupting a supply of power that is needed for the operation of the heating element 62. The operation of the fuse 11 is independent of the controller 10.

A ninth component of the coffee maker 1 shown is a temperature detector 12 which is arranged to detect a temperature inside the boiler 6. The temperature detector 12 is connected to the controller 10, so that the controller 10 is capable of receiving signals representing the temperature inside the boiler 6 from the temperature detector 12.

When a user decides to use the coffee maker 1 to make one or two cups of coffee, he first needs to prepare the coffee maker 1 by following the steps listed below:
1) filling the water tank 3 with water. In the process, the user needs to take care that the quantity of water in the water tank 3 is at least the quantity of water needed for making the cup of coffee.
2) placing at least one coffee pad in the brew chamber 8. The coffee maker 1 may comprise, for example, a separate carrier for receiving the coffee pad(s), which may easily be inserted into the brew chamber 8.
3) placing one or two coffee cups in the proper positions for receiving coffee from the coffee maker 1.

It is noted that the coffee maker 1 comprises a float (not shown) for determining a water level in the water tank 2. During the coffee-making process, the controller 10 detects and interprets the position of the float. If it is found that the water tank 2 is empty or the quantity of water inside the water tank 2 is insufficient for the required quantity of coffee, the controller 10 will stop the procedure and warn the user of the coffee maker 1 by means of the indicator light 24, which in that case is activated to blink quickly. For example, the indicator light 24 is activated for 0.1 second and deactivated for 0.1 second in alternation by the controller 10. The coffee-making process is not started until the controller 10 detects by means of the float that the water level in the water tank 2 has reached a sufficient value.

The coffee maker 1 is activated by pressing the main button 21. According to an important aspect of the present invention, as soon as the controller 10 receives a signal generated by pressing of the main button 21, the controller 10 starts a primary procedure. This primary procedure, which is part of the total coffee making procedure, is illustrated in FIG. 2 and is described below.

Figure 2:
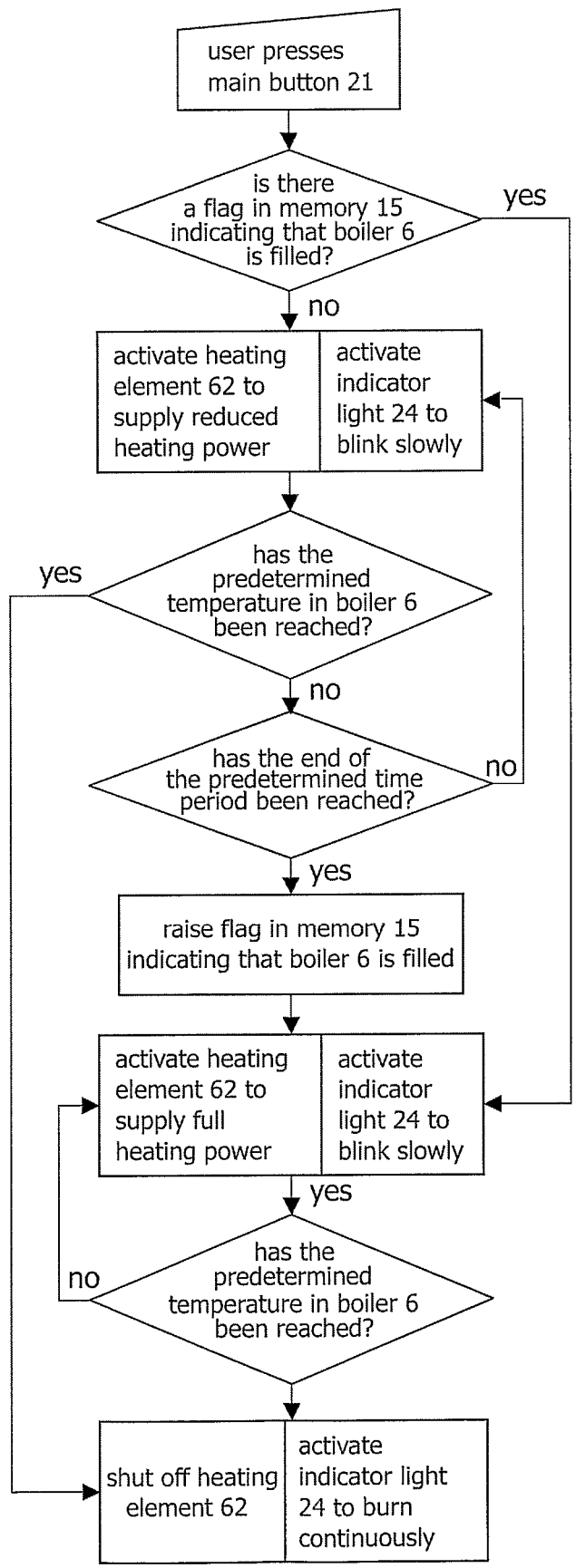
FIG. 2 is a flowchart showing a preferred series of steps followed when the coffee maker is used.

It is noted that FIG. 2 is a flowchart showing important steps of the primary procedure. The steps not to be performed by the user, i.e. the steps listed in rectangular boxes, are performed by the controller 10 of the coffee maker 1. The same is true for the decisions to be taken during the procedure, which are mentioned in diamond-shaped boxes.

The primary procedure starts with checking whether a flag indicating that the boiler 6 is filled is present in the memory 15 of the controller 10.

If the flag is present, the controller 10 activates the heating element 62 of the boiler 6. At the same time, the controller 10 activates the indicator light 24 to blink slowly in order to inform the user that the coffee maker 1 is busy. For example, the indicator light 24 is activated for 1 second and deactivated for 1 second in alternation by the controller 10.

In the situation in which the flag is present, it is certain that the boiler 6 is filled. Therefore, it is safe to activate the heating element 62 to supply full heating power. The supply of heating power to the contents of the boiler 6 raises the temperature in the boiler 6. Throughout the heating process, the temperature detector 12 transmits a signal representing the temperature in the boiler 6 to the controller 10, which is programmed to check whether the actual temperature matches a predetermined temperature. As soon as the predetermined temperature is found to have been reached, the heating element 62 is shut off, and the indicator light 24 is activated to burn continuously. The user is thus informed that the coffee maker 1 is ready for further use, and that he may press the single-cup button 22 or the two-cups button 23 in order to start a secondary procedure, during which the hot water is forced to flow from the boiler 6 to the outlet nozzle 9, through the brew chamber 8 and the at least one coffee pad positioned inside the brew chamber 8, and during which fresh water from the water tank 2 is supplied to the boiler 6 for the purpose of a next coffee making procedure.

If the flag representing a filled state of the boiler 6 is not present in the memory 15 of the controller 10, it may be that the boiler 6 is empty. In particular, in such a case, there are two possibilities: 1) the boiler 6 is indeed empty, and 2) the boiler 6 is filled despite the fact that the flag is absent. The latter situation may occur, for example, when the flag has been present in the memory 15 of the controller 10, but has been lost as a result of the coffee maker 1 getting disconnected from the mains. In order to make sure that overheating of the boiler 6 will not occur, a heating process is performed of which one single aspect differs from the heating process as described in the preceding paragraph, this one single aspect being the level of heating power supplied by the heating element 62. When the flag is absent, the level of supplied heating power is reduced for a predetermined period of time. For example, the reduced level of supplied heating power is ⅔ of the normal level of supplied heating power (i.e. the level of supplied heating power which is associated with the situation in which the flag is present and in which the heating element 62 is activated to supply full heating power). Naturally, a length of the predetermined period of time and a starting time of the predetermined period of time are chosen so as to ensure that, if the boiler 6 is empty, the heating process takes place at a reduced power level when the predetermined temperature of the boiler 6 is reached and the controller 10 is activated to shut off the heating element 62. On the other hand, it is preferred that? the length of the predetermined period of time is chosen such that, if the boiler 6 is filled, the heating process only takes additional time for safety reasons and does not unnecessarily last longer than a normal heating process. However, that does not alter the fact that the possibility of applying the reduced power level during the entire process of heating the contents of the boiler 6 to the predetermined temperature is within the scope of the present invention.

In the following, a preferred series of steps of a heating process associated with the situation in which the flag indicating a filled state of the boiler 6 is not present in the memory 15 is described with reference to FIG. 2. As was noted above, the heating element 62 is activated to supply heating power at a reduced level for a predetermined period of time during the heating process. In the present example, the predetermined period of time is started as soon as the heating process is started.

During the predetermined period of time, the indicator light 24 is activated to blink slowly in order to inform the user that the coffee maker 1 is busy. The controller 10 constantly checks the temperature of the boiler 6 by means of the temperature detector 12.

If the boiler 6 is filled, and the contents of the boiler 6 have not been pre-heated during a preceding heating process, the end of the predetermined period of time is reached before the predetermined temperature of the boiler 6 is reached. In that case, a flag indicating that the boiler 6 is filled is raised in the memory 15 at the end of the predetermined period of time, and the controller 10 activates the heating element 62 to heat the contents of the boiler 6 further by supplying full power until the controller 10 senses that the predetermined temperature is reached, on the basis of input supplied by the temperature detector 12. As soon as the predetermined temperature is found to have been reached, the heating element 62 is shut off, and the indicator light 24 is activated to burn continuously.

If the boiler 6 is filled, and the contents of the boiler 6 have been pre-heated, the predetermined temperature of the boiler 6 may be reached before the end of the predetermined period of time is reached. In that case the controller 10 shuts off the heating element 62 as soon as it is found that the predetermined temperature has been reached and activates the indicator light 24 to burn continuously. A flag indicating that the boiler 6 is filled is not raised in the memory 15, as a situation in which the predetermined temperature is reached before the end of the predetermined period of time also occurs when the boiler 6 is empty. A situation in which the flag is erroneously raised, leading to a situation in which full heating power is supplied to an empty boiler 6, is thus excluded.

If the boiler 6 is empty, the predetermined temperature of the boiler 6 is reached before the end of the predetermined period of time, as an empty boiler 6 heats up faster than a filled boiler 6. In that case the controller 10 shuts off the heating element 62 as soon as it is found that the predetermined temperature has been reached and activates the indicator light 24 to burn continuously. In this state of the coffee maker 1, the user will notice that the coffee maker 1 does not perform its task of supplying coffee the moment this user presses the single-cup button 22 or the two-cups button 23 in order to start the secondary procedure. More in particular, the user will realize that the cause of the malfunctioning of the coffee maker 1 is that the boiler 6 is empty, and he will initiate a filling process. Only after the filling process has been performed, a flag indicating that the boiler 6 is filled is raised in the memory 15, and a subsequent heating process may be performed at full power.

The reduced power level applied when the boiler 6 is empty reduces the risk of damage to the coffee maker 1 as a result of overheating practically to zero. As the boiler 6 gets heated at a slower rate, there is no risk of the temperature of the boiler 6 getting too high shortly after the heating element 62 has been shut off.

The heating power provided by the heating element 62 may be reduced in any suitable way. For example, the heating element 62 may comprise an electrical heating coil or other electrical heating means, and the reduction of the heating power may be realized by a reduction of the electrical power supplied to the heating coil.

Within the scope of the present invention, it is possible that the steps of the coffee-making procedure are such that, when the coffee maker 1 is activated, the end of the secondary procedure is reached without user intervention. In that case the user has to indicate at the start of the coffee making procedure whether he desires one cup of coffee or two cups of coffee by pressing the relevant button 22, 23. However, a coffee-making procedure performed uninterruptedly from start to finish is not preferred, because the user may take alarm at the sudden start of the pump 4 during the procedure.

In accordance with the above examples, the controller 10 may be programmed so as to inform the user that the heating process of the water inside the boiler 6 is taking place, for example by means of the indicator light 24, which may be activated to blink slowly. In that case, the user knows the water is being heated as long as the indicator light 24 is blinking slowly, and that the coffee maker 1 is ready for further use as soon as the indicator light 24 is burning continuously. Furthermore, the indicator light 24 may be used to indicate that something is wrong. As was noted above, the controller 10 may activate the indicator light 24 to blink quickly in such a situation.

It will be understood that, within the scope of the present invention, it is not essential what type of indicating means is used, neither is it essential what kind of behavior of the indicating means is coupled to a certain situation.

It will be clear to those skilled in the art that the scope of the present invention is not limited to the examples discussed above, but that several amendments and modifications thereof are possible without deviating from the scope of the present invention as defined in the attached claims.

The coffee maker 1 described above comprises a single-cup button 22 and a two-cups button 23. However, within the scope of the present invention, it is not essential whether the number of cups can be chosen or not, and it is not essential what quantity or quantities of coffee can be delivered by the coffee maker 1. For example, a coffee maker 1 arranged to deliver only one predetermined amount of coffee and having only one button for starting the secondary procedure is also covered by the present invention. In fact, the present invention is applicable to coffee makers 1 and all kinds of other devices comprising a boiler 6 having heating means for heating a content of the boiler 6, the further design of the coffee maker 1 or the other device being of secondary importance.

Figure 3:
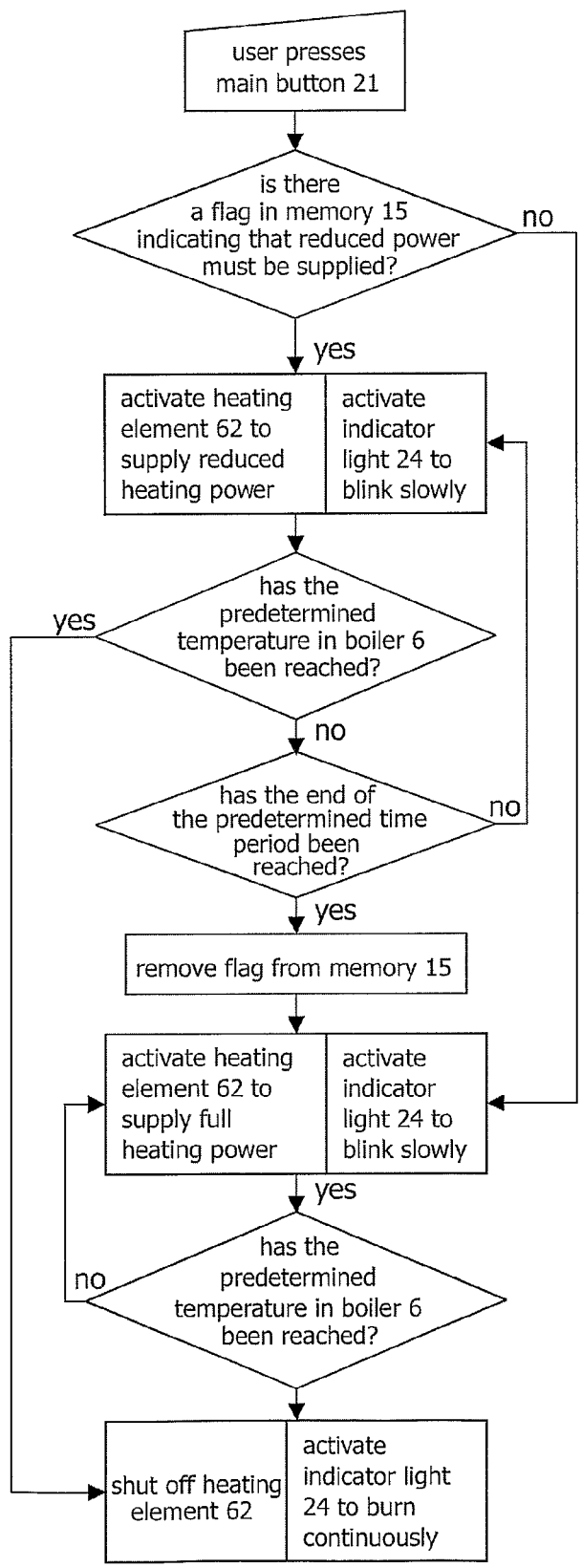
FIG. 3 is a flowchart showing an alternative to the flowchart as shown in FIG. 2.

FIG. 3 shows an alternative series of steps of the primary procedure of the coffee-making procedure, which steps are followed when a choice is made for raising a flag indicating that the power level needs to be reduced instead of raising a flag indicating that the boiler 6 is filled, which is an alternative possibility within the scope of the present invention. Logically, the only difference with respect to the procedure described further above is that every step that has to do with the flag is reversed. Hence, a detected presence of the flag triggers a heating process in which the heating power is supplied at a reduced level over a predetermined period of time, and a detected absence of the flag triggers a heating process in which full heating power is supplied from the start. Furthermore, when the heating process at a reduced power level has been performed, and the end of the predetermined period of time has been reached, the flag is removed from the memory 15.

In the context of the present invention, the absence of the flag indicating a need to perform the heating process at a reduced power level is to be regarded as an indication that the boiler 6 is filled. If this flag is present, such an indication is not given, and the heating process is performed according to another schedule than if the flag is absent.

Generally speaking, according to the present invention, every time the primary procedure of the coffee making procedure is started, one of two possible heating processes is carried out, the choice of the heating process being determined by the presence or the absence of an indication that the boiler 6 is filled. In the examples described with reference to FIGS. 2 and 3, a first possible heating process simply involves activating the heating element 62 to supply full heating power until a predetermined temperature of the boiler 6 has been reached, and a second possible heating process involves activating the heating element 62 to supply reduced heating power over a predetermined period of time, and subsequently activating the heating element 62 to supply full heating power until the predetermined temperature of the boiler 6 has been reached. The second possible heating process may already be stopped during the time power is supplied at a reduced level, i.e. when it is detected hat the predetermined temperature has been reached before the predetermined period of time has lapsed.

In the examples described, the second possible heating process starts with the supply of reduced heating power and ends with the supply of full heating power, provided that the predetermined temperature of the boiler 6 is not reached during the period that the supply of reduced heating power takes place. It is noted that, within the scope of the present invention, it is also possible that the second possible heating process is carried out in an alternative manner. For example, the second possible heating process may start by supplying full heating power over a predetermined period of time and end by supplying reduced heating power until the predetermined temperature of the boiler 6 is reached. In such a case it is important that the predetermined period of time during which full power is supplied should be so short that an empty boiler 6 does not get overheated.

When the method according to the present invention is used, a safer use of the coffee maker 1 is guaranteed. The heating process takes place at full power only if it is certain that the boiler 6 is filled. If it is not certain that the boiler 6 is filled, the heating process takes place at reduced power, i.e. at a slower rate, and it is ensured that the safeguard offered by the procedure of stopping the heating process as soon as the predetermined temperature is reached is effective under all circumstances. Only in exceptional circumstances will the fuse 11 be addressed. When the processes as described with reference to FIGS. 2 and 3 are performed, the heating element 62 is shut off as soon as the predetermined temperature of the boiler 6 has been reached, and there is no need for the fuse 11 to come into action.

All that is needed for carrying out the method according to the present invention is a controller 10 having a memory 15 in which a flag can be raised, wherein various possibilities for an indicative function of the flag exist. It was described above that the flag may be representative of a filled state of the boiler 6, and that it is also possible that the flag provides an indication that the heating process needs to be performed at a reduced power level. According to an important aspect of the present invention, the controller 10 is programmed for first checking the presence of a flag in the memory 15 before starting a heating process, and for activating a heating process that suits the outcome of the check.

It is noted that, for a proper practical functioning of the coffee maker 1, the controller 10 is not only programmed to control the heating element 62 to supply reduced heating power in the absence of an indication that the boiler 6 is filled, but also under various other circumstances. For example, when the temperature of the content of the boiler 6 is close to the predetermined temperature, the heating power is reduced in order to prevent a situation in which the heating process takes place at a rate which is so fast that it is not possible to end at the predetermined temperature. In such a case, the heating power is, for example, reduced to ⅓ of the full heating power. If the coffee maker 1 is provided with a function of keeping the contents of the boiler 6 at a predetermined temperature over a predetermined period of time, this function will be carried out at a reduced power level, for example 3% of the full power level. It should be understood that the present invention does not relate to the process of supplying reduced heating power as such. On the contrary, the present invention relates to measures for ensuring that reduced heating power is supplied in every possible situation in which there is a risk that the boiler 6 is empty.

Summarizing, in a coffee maker 1 having a boiler 6 and heating means such as a heating element 62 for heating a content of the boiler 6, safety measures are taken to prevent breakdown of the coffee maker 1 in the case in which the heating means are activated while the boiler 6 is empty. The coffee maker 1 comprises a controller 10 having a memory 15 in which a flag indicating a filled state of the boiler 6 can be raised, which controller 10 is programmed to activate the heating means to supply reduced heating power if the memory 15 does not contain the flag. A situation in which the boiler 6 gets overheated, even if the heating means are shut off after having been operated, is prevented thereby.

The invention claimed is:

1. A method of controlling a hot beverage making device having a boiler for supplying heated water to a brew chamber through a conduit, the method comprising acts of:
   indicating when the boiler is filled and not filled;
   supplying heating power to the boiler to heat the water within the boiler in accordance with a secondary schedule of at least one of power and time when the boiler is not filled; and
   supplying heating power to the boiler to heat the water within the boiler in accordance with primary schedule of at least one of power and time when the boiler is filled or an end of the secondary schedule is reached before the water within the boiler has reached a predetermined temperature,
   wherein the act of supplying heating power to the boiler in accordance with the secondary schedule comprises an act of supplying a level of the heating power in accordance with the secondary schedule that is smaller than a level of the heating power supplied in accordance with the primary schedule over at least a portion of the time covered by the secondary schedule.

2. The method according to claim 1, wherein the act of supplying heating power to the boiler in accordance with the secondary schedule comprises an act of supplying the level of the heating power of the secondary schedule that is smaller by a factor that is substantially constant over time.

3. The method according to claim 1, wherein indicating comprises an act of storing a flag in memory, the flag having a status indicating that the boiler is filled or not filled.

4. The method according to claim 3, wherein the act of supplying heating power to the boiler in accordance with the secondary schedule is based on the status of the flag in the memory.

5. The method according to claim 1, wherein the heater is electrical and the level of the heating power during the primary schedule and the secondary schedule is obtained by an act of adjusting a level of electrical power supplied to the electrical heater.

6. The method according to claim 1, comprising act of monitoring an actual temperature of the boiler, and shutting off the heater when the predetermined temperature of the boiler is reached.

7. A coffee maker device, comprising:
   a boiler;
   a brewing chamber;
   a conduit configured to supply heated water from the boiler to the brewing chamber;
   a heater for heating water within the boiler;
   an indicator for indicating that the boiler is filled; and
   a controller programmed to
      supply heating power to the boiler to heat the water within the boiler in accordance with a secondary schedule of at least one of power and time when the boiler is not filled; and
      supply heating power to the boiler to heat the water within the boiler in accordance with a primary schedule of at least one of power and time when the boiler is filled or an end of the secondary schedule is reached before the water within the boiler has reached a predetermined temperature,
   wherein the controller is programmed to supply a level of the heating power in accordance with the secondary schedule that is smaller than a level of the heating power supplied in accordance with the primary schedule over at least a portion of the time covered by the secondary schedule.

8. The device according to claim 7, further comprising a memory wherein the indicator is a flag stored in the memory.

9. The device according to claim 8, wherein the controller is programmed to supply heating power to the boiler in accordance with the secondary schedule based on a presence of the flag in the memory.

10. The device according to claim 7, further comprising a temperature detector configured to detect a temperature of the boiler and transmit a signal representing the temperature of the boiler to the controller, wherein the controller is programmed to shut off the heater when the predetermined temperature of the boiler has been reached.

\* \* \* \* \*